(12) United States Patent  (10) Patent No.: US 8,064,007 B2
Mo et al.  (45) Date of Patent: Nov. 22, 2011

(54) BACKLIGHT MODULE AND DISPLAY DEVICE USING THE SAME

(75) Inventors: Yao-An Mo, Hsin-Chu (TW); Ta-Jen Huang, Hsin-Chu (TW); Kang-Wei Cheng, Hsin-Chu (TW); Hsin-An Chang, Hsin-Chu (TW); Chia-Hun Cheng, Hsin-Chu (TW); Chieh-Jen Cheng, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 264 days.

(21) Appl. No.: 12/618,889

(22) Filed: Nov. 16, 2009

(65) Prior Publication Data

US 2010/0123851 A1  May 20, 2010

(30) Foreign Application Priority Data

Nov. 18, 2008 (TW) .............................. 97144533 A

(51) Int. Cl.
*G02F 1/1333* (2006.01)
(52) U.S. Cl. ............................ 349/58; 349/65; 362/97.2
(58) Field of Classification Search .................... 349/65; 362/97.2, 633
See application file for complete search history.

(56) References Cited

U.S. PATENT DOCUMENTS 7,944,527 B2 * 5/2011 Jeon et al. ....................... 349/65
2007/0025098 A1 2/2007 Kim et al.

FOREIGN PATENT DOCUMENTS

TW M315841 7/2007
TW M324216 12/2007

OTHER PUBLICATIONS

English language translation of abstract of TW M324216 (published Dec. 21, 2007).
English language translation of abstract of TW M315841 (published Jul. 21, 2007).

* cited by examiner

*Primary Examiner* — Richard Kim
(74) *Attorney, Agent, or Firm* — Thomas, Kayden, Horstemeyer & Risley, LLP

(57) ABSTRACT

The present disclosure is a backlight module including a light guide plate, a supporter, and a light source module. The light guide plate has a light incident side. The supporter has a bottom plate, a sidewall, and a top plate corresponding to the bottom plate. The bottom plate extends from a first end of the sidewall toward the light guide plate, and the top plate extends along a second end of the sidewall toward the light guide plate. The length of the sidewall is longer than the length of the top plate, such that the top plate corresponding to the sidewall forms at least one breach to expose the second end of the sidewall. The bottom plate, the top plate, and the sidewall together form an accommodating space, and the light incident side of the light guide plate is disposed between the top plate and the bottom plate. The light source module is disposed in the accommodating space and partially exposed through the at least one breach. The light source module has at least one light emitting unit and a printed circuit board. The light emitting unit is disposed on the printed circuit board, such that an emitting surface of the light emitting unit can face the light incident side of the light guide plate.

21 Claims, 9 Drawing Sheets

BACKLIGHT MODULE AND DISPLAY DEVICE USING THE SAME

This application claims priority based on a Taiwanese patent application No. 097144533 filed on Nov. 18, 2008, the disclosure of which is incorporated herein by reference in its entirety.

BACKGROUND OF THE DISCLOSURE

1. Field of the Disclosure

The present disclosure relates to a backlight module. More particularly, the present disclosure relates to a backlight module and a display device using the same which has a single supporter to position a light guide plate and a light source module.

2. Description of the Prior Art

Backlight module is one of the essential components in liquid crystal display panels (LCD panels.) Since the liquid crystal (LC) does not emit light itself, the function of the backlight module is to provide enough brightness and uniformly distributed light sources to enable the LCD to display images normally. As the LCD panel is now widely applied to consumer products such as monitors, notebook computers, digital cameras, protectors, etc., the demand for backlight modules and associated components is also increased rapidly.

As the technology of light emitting diodes (LEDs) progresses continuously with the LEDs characterized in, for example, low power consumption, environmentally conscious design (no mercury), long product life span, small in volume, high brightness, and high color reproducibility, etc., LEDs can provide the LCD with a better color performance. Accordingly, the LEDs are progressively applied to the backlight module of the LCD.

FIG. 1 shows an exposed view of a conventional backlight module 50. The backlight module 50 is composed of a housing 10, a light guide plate 16, a reflective plate 18, a set of light emitting diode module 20, and a set of L-shape plate 30. The light guide plate 16 and the reflective plate 18 are disposed on the bottom of the housing 10. The light emitting diode module 20 is composed of a plurality of light emitting diodes 24, which are disposed on a printed circuit board 22. When the conventional light emitting diode module 20 is assembled on the sidewall 12 of the housing 10, the L-shape plate 30 serves as a holder to allow the light emitting diode module 20 to be assembled in the slit 14 of the housing 10. Then a plurality of screws (not illustrated) screw the printed circuit board 22 and the L-shape plate 30 together.

In other assembly technology of the backlight module 50, the light emitting diode module 20 may be attached to the inner wall of the longer side of the L-shape plate 30 and then directly mounted on the sidewall 12 of the housing 10 to accomplish the assembly of the backlight module 50. However, no matter the light emitting diode module 20 is assembled by what kind of conventional methods, the light emitting diode module 20 and the light guide plate 16 cannot be assembled and positioned at the same time, adversely affecting the optical performance of the backlight module 50. Therefore, the present disclosure is provided to improve the aforesaid problems and achieve other objectives as follows.

SUMMARY OF THE DISCLOSURE

It is an objective of the present disclosure to provide a backlight module and a display device using the same for using a single component to fix a light source module and a light guide plate in proper places.

It is another objective of the present disclosure to provide a backlight module and a display device using the same for easy assembly to reduce the assembly time and cost.

It is another objective of the present disclosure to provide a backlight module and a display device using the same for use with a top emitting light emitting diode (LED).

It is another objective of the present disclosure to provide a backlight module and a display device using the same for weight reduction and cost reduction.

The present disclosure provides a backlight module including a light guide plate, a supporter, and a light source module. The light guide plate has a light incident side. The supporter has a bottom plate, a sidewall, and a top plate corresponding to the bottom plate. The bottom plate extends from a first end of the sidewall toward the light guide plate, and the top plate extends along a second end of the sidewall toward the light guide plate. The length of the sidewall is longer than the length of the top plate, such that the top plate corresponding to the sidewall forms at least one breach to expose the second end of the sidewall. The bottom plate, the top plate, and the sidewall together form an accommodating space, and the light incident side of the light guide plate is disposed between the top plate and the bottom plate. The light source module is disposed in the accommodating space and partially exposed through at least one breach. The light source module has at least one light emitting unit and a printed circuit board. The light emitting unit is disposed on the printed circuit board, such that an emitting surface of the light emitting unit can face the light incident side of the light guide plate.

In a preferred embodiment, the at least one breach includes a first breach and a second breach respectively formed on two sides of the top plate to expose two ends of the second end of the sidewall. In another embodiment, the breach includes a closed loop opening formed between the second end of the sidewall and an edge of the top plate corresponding to the second end. In other embodiment, the breach is formed by cutting a portion of the top plate to form an open loop opening. In addition, the backlight module preferably includes an adhesive material disposed between the sidewall and the printed circuit board for attaching and positioning the light source module.

The present disclosure further provides a display device including a frame, a liquid crystal display penal, and a backlight module. The backlight module and the liquid crystal display penal are disposed parallel to each other in the frame. The backlight module includes structures of the abovementioned backlight module and will not be elaborated again.

DETAILED DESCRIPTION OF THE PREFERRED EMBODIMENT

The present disclosure is a backlight module and a display device using the same. The backlight module has a simplified structure for easy assembly. In a preferred embodiment, a light source module of the backlight module is a light emitting diode (LED) module, and the light source is a LED light source. The LED module can be a plurality of individual LEDs or multiple LEDs arranged in a modular manner, such as a LED light bar, etc. In addition, the backlight module of the present disclosure is preferably applied in liquid crystal display panels (LCD panels.) In other embodiment, however, the backlight module may be used in advertisement board or other display devices as appropriate.

Figure 1:
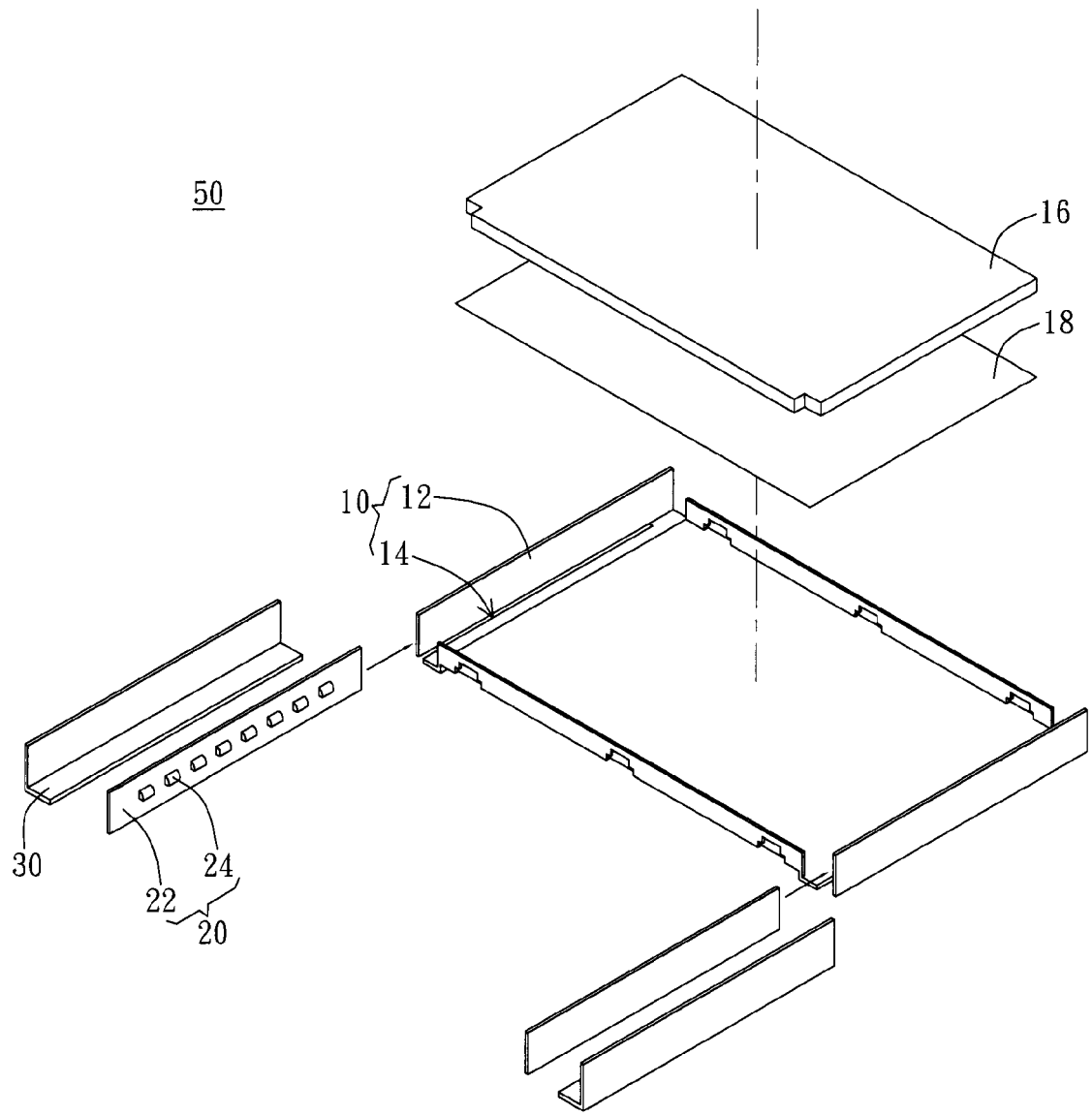
FIG. 1 shows an exploded view of a conventional backlight module.
Figure 2:
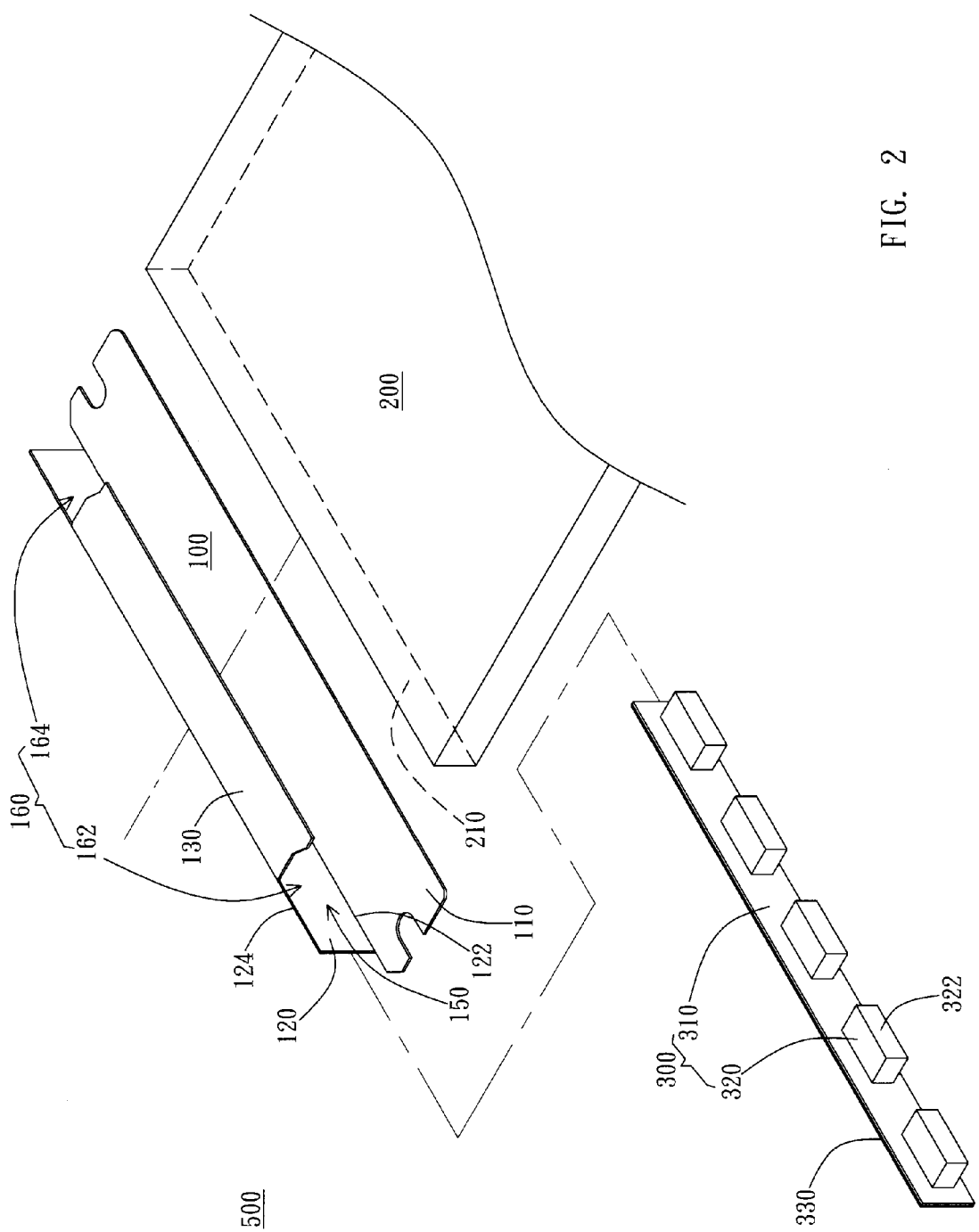
FIG. 2 illustrates an exploded view of a supporter according to the present disclosure.

FIG. 2 illustrates an exposed view of a backlight module of the present disclosure. The backlight module 500 of the present disclosure includes a light guide plate 200, a supporter 100, and a light source module 300. In the present embodiment, the light guide plate 200 has a light incident side 210, which is preferably located on a shorter side of the light guide plate 200. The supporter 100 preferably has a bottom plate 110, a sidewall 120, and a top plate 130 corresponding to the bottom plate 120, which are integrally formed as a plate with a C-shaped cross section (hereinafter, referred to C-shaped plate). The way to integrally form the C-shaped plate includes bending, stamping, punching, or other proper methods. In other embodiments, however, the supporter 100 may be formed by combining separate components.

Figure 3A:
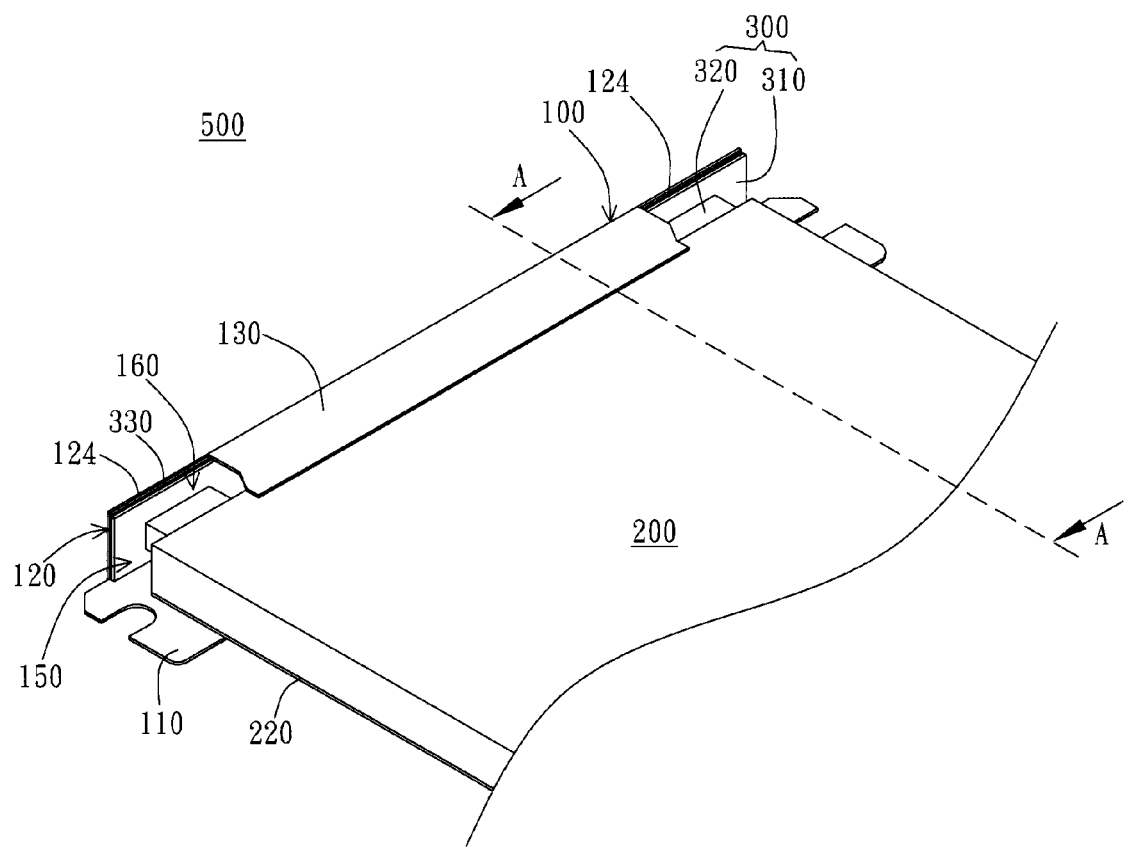
FIG. 3A illustrates a partial schematic view of a backlight module with a light guide plate according to the present disclosure.

Please refer to FIG. 2 and FIG. 3A, the bottom plate 110 preferably extends from a first end 122 of the sidewall 120 toward the light guide plate 200, and the top plate 130 preferably extends along a second end 124 of the sidewall 120 toward the light guide plate 200. In other words, the bottom plate 110 is disposed parallel to the top plate 130, and the bottom plate 110 and the top plate 130 are connected to the first end 122 and the second end 124 of the sidewall 120, respectively. The first end 122 and the second end 124 are formed on two longer sides of the sidewall 120. The length of the sidewall 120 is preferably longer than the length of the top plate 130, such that the top plate 130 with respect to the sidewall 120 forms at least one breach 160. The breach 160 partially exposes the second end 124 of the sidewall 120. The length of the sidewall 120 or the length of the top plate 130 is preferably a length associated with the length of the light incident side 210 of the light guide plate 200. Moreover, the breach 160 is substantially formed on proper location of the top plate 130 to expose the second end 124.

In the embodiment shown in FIG. 2, the supporter 100 is preferably formed with a first breach 162 and a second breach 164 respectively formed on two sides of the top plate 130 to expose two ends of the second end 124 of the sidewall 120. The bottom plate 110, the top plate 130, and the sidewall 120 together form an accommodating space 150 to allow the light incident side 210 of the light guide plate 200 to be interposed between the top plate 130 and the bottom plate 110, as shown in FIG. 3A. In other words, the light incident side 210 of the light guide plate 200 is slightly inserted into the accommodating space 150 to be clamped and positioned between the bottom plate 110 and the top plate 130. Since the bottom plate 110 and the top plate 130 can hold the light guide plate 200 in place, the relative position between the light guide plate 200 and the light source module 300 can be fixed. Thus, such an arrangement can prevent the light guide plate 200 from shaking to cause the change in optical behavior and the reduction in lighting efficiency. In addition, in other embodiments, the supporter 100 may have only one breach, e.g. 162 or 164, or more than one breach, e.g. 162 and 164. The embodiment shown in FIG. 2 and FIG. 3 just illustrates one of the examples, and the present disclosure is not limited thereto.

The light source module 300 may also be disposed in the accommodating space 150 and partially exposed through the at least one breach 160. In the embodiment shown in FIG. 2 and FIG. 3A, the advantage of partially exposing the light source module 300 through the first breach 162 and the second breach 164 is to position the light source module 300 easily or for other purposes. For example, when the light source module 300 is to be assembled to the supporter 100, the light source module 300 can be accessed and held via the first breach 162 and the second breach 164, and the light source module 300 is then fixed on the supporter 100. The light source module 300 has at least one light emitting unit 320 and a printed circuit board 310. The light source module 300 is preferably a light emitting diode light bar, and the light emitting unit 320 is composed of a plurality of light emitting diodes disposed on one side of the printed circuit board 310. In other embodiments, however, the light source module 300 may be a cold cathode fluorescent lamp module (CCFL module) or other suitable light source modules. Furthermore, the printed circuit board 310 may be a rigid printed circuit board or a flexible printed circuit board depending on the design requirements.

In addition, the light source module 300 is preferably attached to the supporter 100 by an adhesive material 330 in a manner that a light emitting surface 322 of the light emitting unit 320 corresponds to the light incident side 210 of the light guide plate 200. In other words, the adhesive material 330 is disposed between the printed circuit board 310 and the sidewall 120 to position the light source module 300 so that the light emitting surface 322 faces the light incident side 210. The adhesive material 330 includes a thermoplastic rubber, a double-sided tape, a single-sided tape, or other suitable adhering materials. When the double-sided tape serves as the adhesive material 330, one side of the double-sided tape is first attached to one side of the printed circuit board 310 opposite to the light emitting unit 320, and then the printed circuit board 310 is inserted into the accommodating space 150 of the supporter 100. Before fixing the printed circuit board 310 onto the sidewall 120 of the supporter 100, the light source module 300 can be held in place via the first breach 162 and the second breach 164. Then, the other side of the double-sided tape is attached to the supporter 100 and the printed circuit board 310 is fixed onto the supporter 100.

Alternatively, when the double-sided tape serves as the adhesive material 330, one side of the double-sided tape is attached to the sidewall 120 in the accommodating space 150 of the supporter 100, and then the release liner (not shown) can be torn off from the other side of the double-sided tape via the first breach 162 and/or the second breach 164 to expose the adhesive of the tape. Then, the printed circuit board 310 is inserted into the accommodating space 150 of the supporter 100 to attach the printed circuit board 310 to the supporter 100 and to be positioned in the accommodating space 150. Because the design of the first breach 162 and the second breach 164, the release liner of the double-sided tape can be very easily torn off to facilitate the operation convenience and speed of the manufacturing process. In order to take into account the operation convenience of the manufacturing processes, the position of attaching the double-sided tape may be changed according to design so as to achieve different attaching sequence or different length of tape, which is not limited to the embodiment. For example, the position of the double-sided tape attached to the sidewall 120 of the supporter 100 may correspond to the first breach 162 and/or the second breach 164.

Figure 3B:
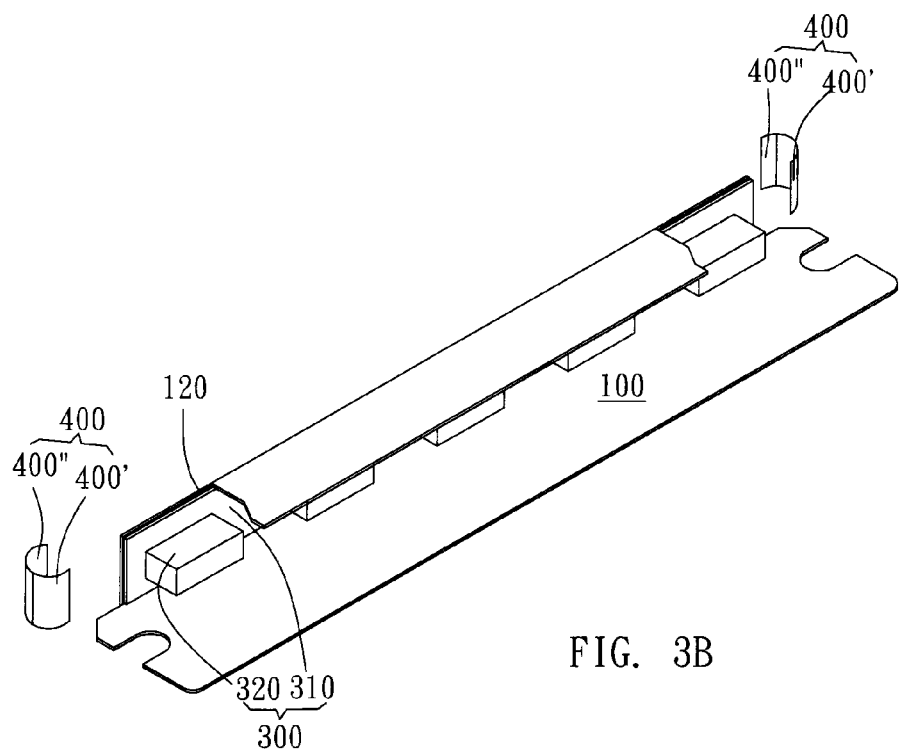
FIG. 3B illustrates an embodiment of the present disclosure showing the attachment of a light source module.
Figure 3C:
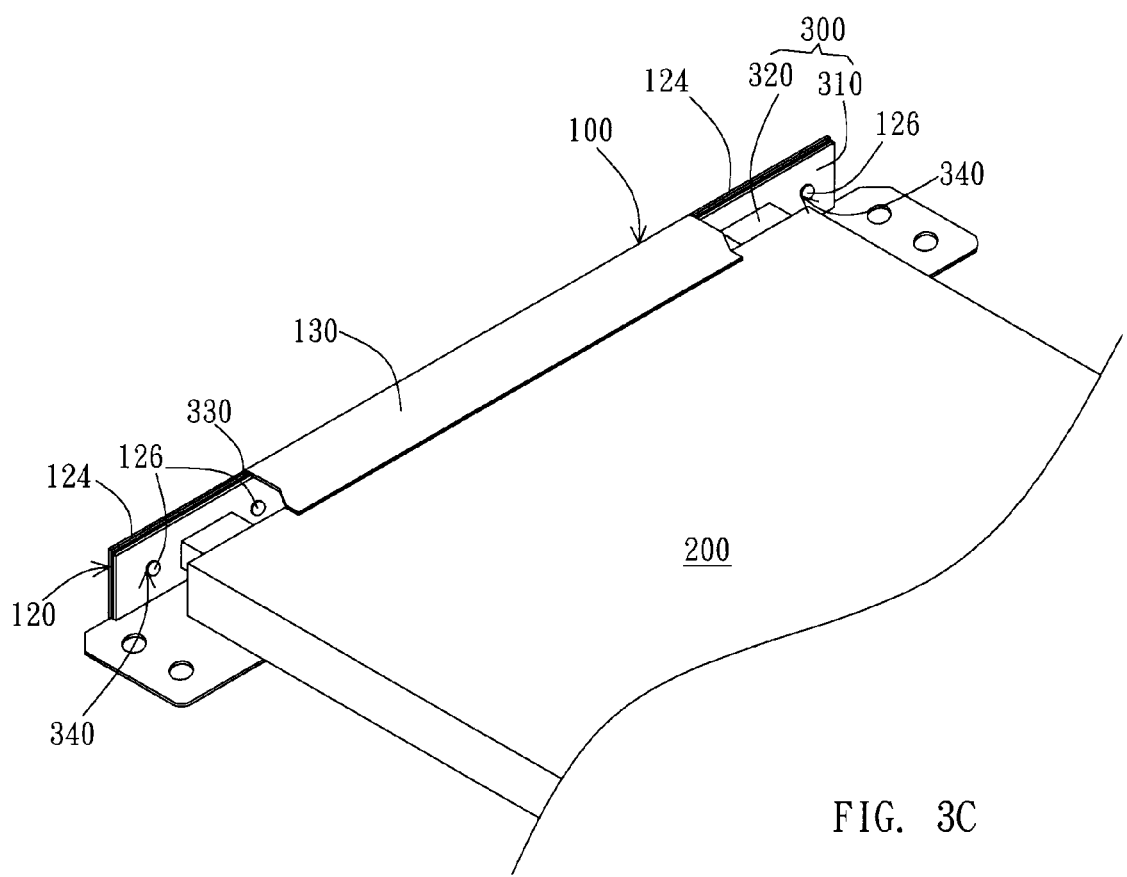
FIG. 3C illustrates another embodiment of the backlight module of the present disclosure.

In the embodiment shown in FIG. 3B, a single-sided tape serves as the adhesive material 330, wherein an appropriate length of the single-sided tape 400 is attached to two sides of the supporter 100. One end 400' of the single-sided tape 400 is attached to the surface on which the printed circuit board 310 and the light emitting unit 320 are located, and the other end 400" of the tape winds to be attached to the outer surface of the sidewall 120 of the supporter 100, i.e., the outer surface is opposite to the surface on which the printed circuit board 310 is disposed. However, in the embodiment shown in FIG. 3C, the sidewall 120 of the supporter 100 may have a protrusion 126, and the printed circuit board 310 of the light source module 300 has a hole 340 for engaging with the protrusion 126. Furthermore, in other embodiments, the light source module 300 may be fixed on the supporter 100 by screwing, riveting, or the combination thereof.

Figure 4A:
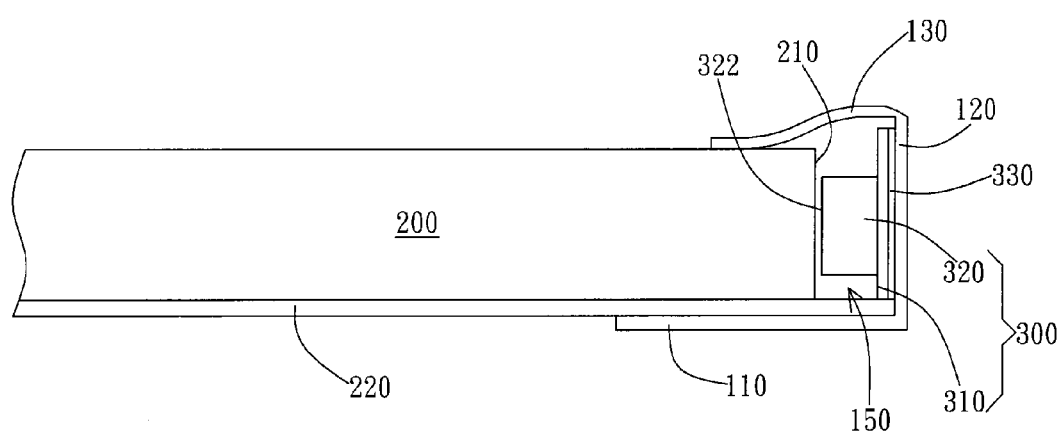
FIG. 4A illustrates a cross-sectional view of FIG. 3A along line A-A.
Figure 4B:
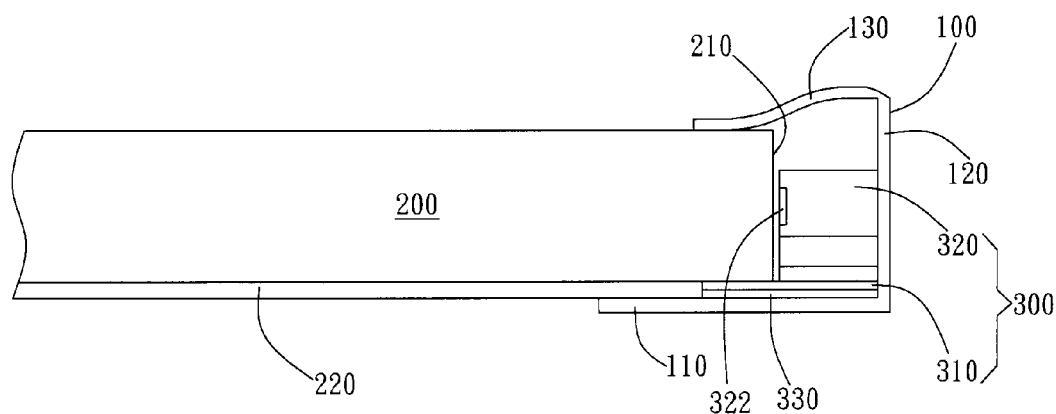
FIG. 4B illustrates another embodiment of the light emitting unit of the present disclosure.

FIG. 4A illustrates a cross sectional view of the backlight module. In the embodiment, the light emitting unit 320 is preferably a top emitting light emitting unit, and the emitting surface 322 of the light emitting unit 320 corresponds to the light incident side 210 of the light guide plate 200. In the embodiment shown in FIG. 4B, however, the light emitting unit 320 may be a side emitting light emitting unit. That is, the emitting surface 322 of the light emitting unit 320 preferably corresponds to the light incident side 210 of the light guide plate 200, and the printed circuit board 310 is preferably positioned on the bottom plate 110 of the supporter 100. In the embodiment, the adhesive material 330 is preferably provided between the bottom plate 110 and the printed circuit board 310 to position the light source module 300. The material of the adhesive material 330 and the attachment method can be referred to the aforesaid embodiments and will not be elaborated again.

Figure 5A:
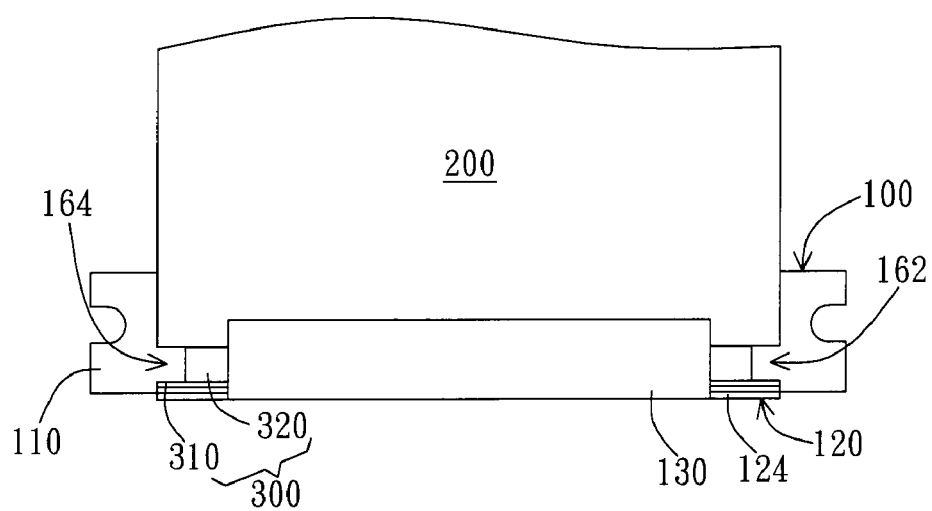
FIG. 5A illustrates a top view of FIG. 3A.
Figure 5B:
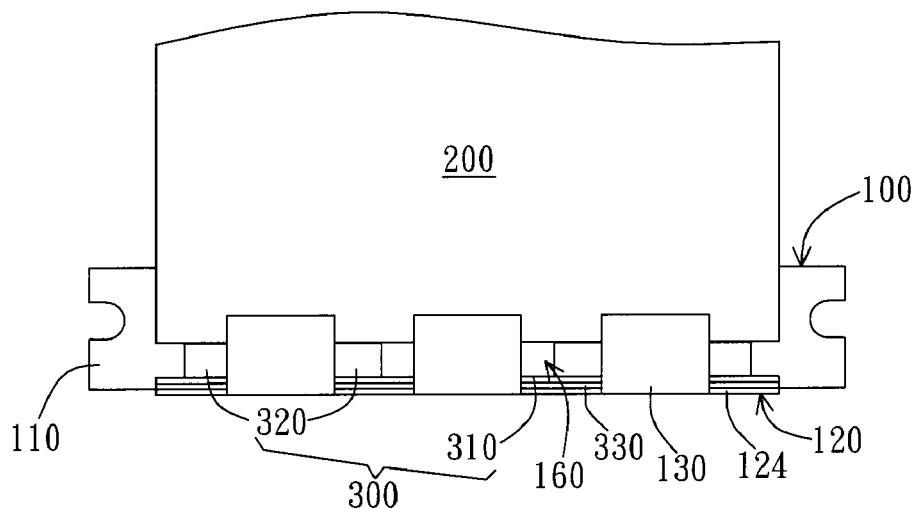
FIG. 5B illustrates another embodiment of a supporter of the backlight module according to the present disclosure.
Figure 5C:
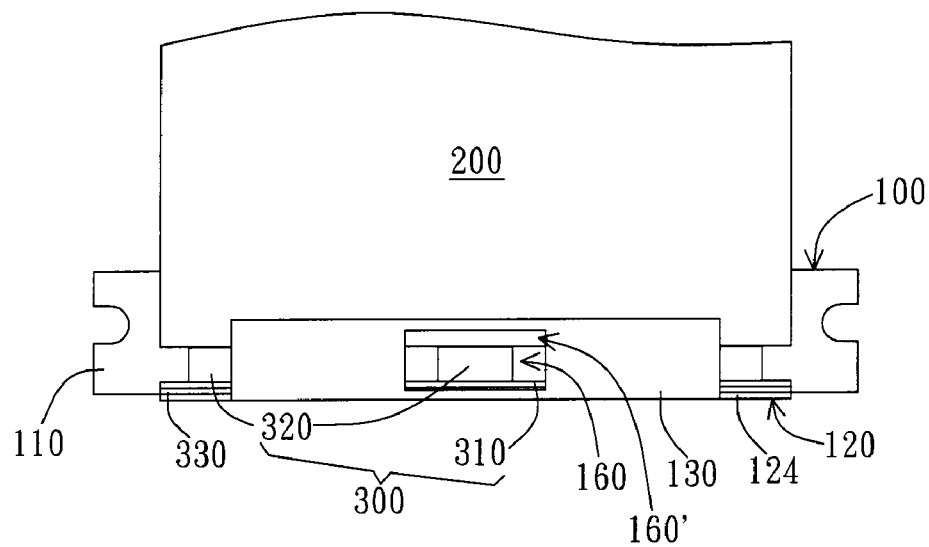
FIG. 5C illustrates another embodiment of the supporter of the backlight module according to the present disclosure.
Figure 5D:
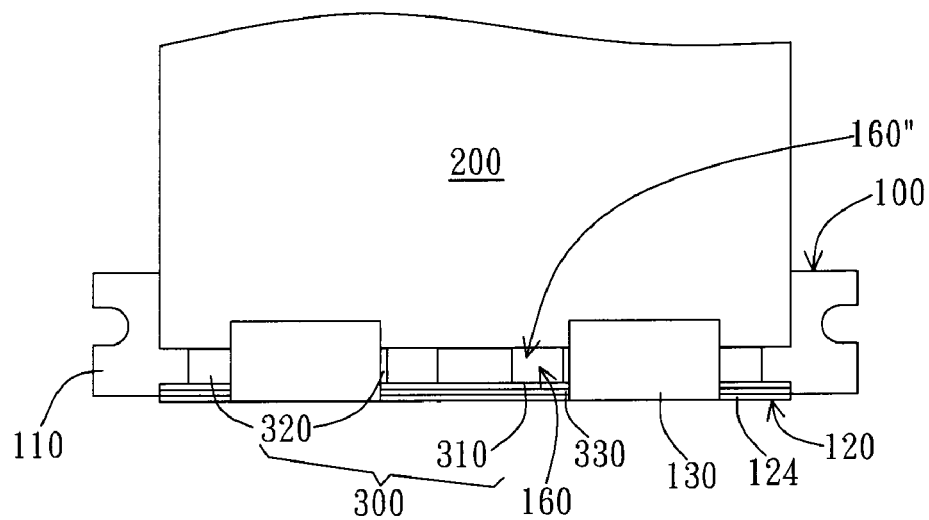
FIG. 5D illustrates yet another embodiment of the supporter of the backlight module according to the present disclosure.

FIG. 5A illustrates a partial top view of the backlight module of the present disclosure. The first breach 162 and the second breach 164 for adjusting or positioning the light source module 300 are formed on two sides of the top plate 130 of the supporter 100. In order to position or assemble the light source module 300 conveniently, the present disclosure provides several different structures of supporter 100. For example, in the embodiment shown in FIG. 5B, multiple breaches 160 and multiple top plates 130 are provided so that the top plates 130 and the breaches 160 are alternatively disposed along the second end 124 of the sidewall 120. Particularly, the breaches 160 can have a uniform size so that the plates 130 are equally spaced apart by the breach 160. For example, the breaches 160 and the top plates 130 are equally spaced on the second end 124 of the sidewall 120 to expose multiple portions of the second end 124. In the embodiment shown in FIG. 5C, however, the breach 160 is formed on the second end 124 of the sidewall 120 as a closed loop opening 160' in the top plate 130 to expose the second end 124 of the sidewall 120. The closed loop opening 160' in the top plate 130 is an opening defined by a continuous and closed loop formed by the inner edge of the top plate 130. That is, the closed loop opening 160' is formed between the second end 124 of the sidewall 120 and an edge of the top plate 130 corresponding to the second end 124. The space defined by the closed loop opening 160' or the periphery of the closed loop opening 160' completely connects the top plate 130 to form the closed loop. In the embodiment shown in FIG. 5D, the breach 160 is preferably an open loop opening 160" formed on the top plate 130 and open toward the light guide plate 200. The open loop opening 160" on the top plate 130 is defined by an open loop with periphery partially connecting the top plate 130 to allow an opening direction to face toward the light guide plate 200.

Figure 6:
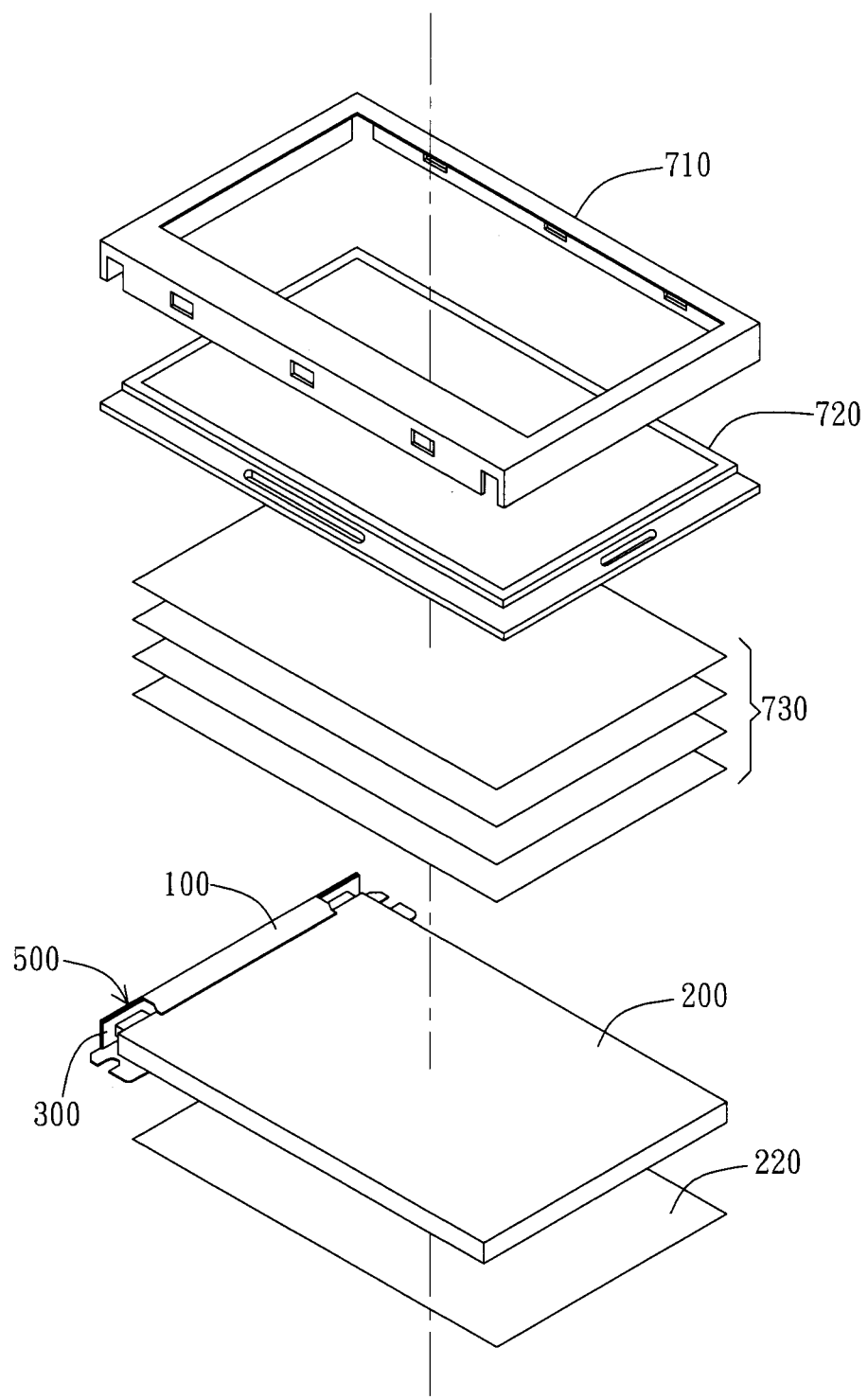
FIG. 6 illustrates an exploded view of the display device of the present disclosure.
Figure 7:
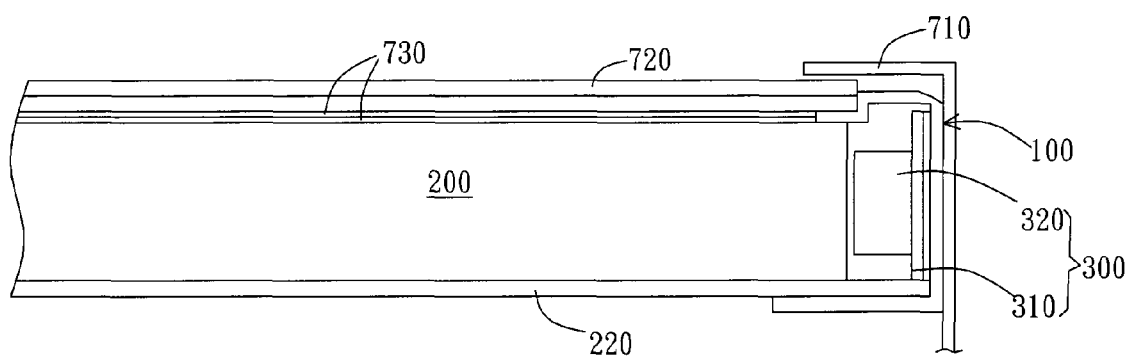
FIG. 7 illustrates a side view of the display device of the present disclosure.

As FIG. 6 and FIG. 7 show, the present disclosure further provides a display device for use with the backlight module of the aforesaid embodiments. The display device of the present disclosure includes a frame 710, a liquid crystal display panel 720, and a backlight module 500. The liquid crystal display 720 is disposed between the frame 710 and the backlight module 500 and configured to receive image singles to form pixels. In the embodiment shown in FIG. 6 and FIG. 7, the display device further includes a plurality of optical films 730 disposed between the liquid crystal display panel 720 and the light guide plate 200. The optical films 730 may include diffusion plates, brightness enhancement films, prism sheets, etc., to provide concentrated light, uniform light, or light with other optical characteristics. The backlight module 500, the liquid crystal display panel 720, and the optical films 730 are preferably disposed parallel to the frame 710.

In the embodiment, the light source module 300 and the supporter 100 are fixed with only one shorter side of the light guide plate 200, and the light emitting unit of the light source module 300 preferably adopts the top emitting LED. In other embodiments, however, the light source module 300 and the supporter 100 may be fixed in pairs with two shorter sides of the light guide plate 200. The other structures of the backlight module 500 may be referred to the aforesaid embodiments and will not be elaborated again.

Although the preferred embodiments of the present disclosure have been described herein, the above description is merely illustrative. Further modification of the disclosure herein disclosed will occur to those skilled in the respective arts and all such modifications are deemed to be within the scope of the disclosure as defined by the appended claims.

We claim:

1. A backlight module, comprising:
   a light guide plate having a light incident side;
   a supporter having a bottom plate, a sidewall, and a top plate corresponding to the bottom plate, the bottom plate extending from a first end of the sidewall toward the light guide plate, and the top plate extending along a second end of the sidewall toward the light guide plate, wherein the length of the sidewall is longer than the length of the top plate, such that the top plate corresponding to the sidewall forms at least one breach to expose the second end of the sidewall, the bottom plate, the top plate, and the sidewall together form an accommodating space, and the light incident side of the light guide plate is disposed between the top plate and the bottom plate; and
   a light source module disposed in the accommodating space and partially exposed through the at least one breach, the light source module having at least one light emitting unit and a printed circuit board, wherein the light emitting unit is disposed on the printed circuit board, such that an emitting surface of the light emitting unit corresponds to the light incident side of the light guide plate.

2. The backlight module of claim 1, wherein the at least one breach includes a first breach and a second breach respectively disposed on two sides of the top plate to partially expose the second end.

3. The backlight module of claim 1, wherein the at least one breach and the top plate are alternatively equally spaced on the second end of the sidewall to partially expose the second end.

4. The backlight module of claim 1, wherein the at least one breach includes a closed loop opening formed between the second end of the sidewall and an edge of the top plate corresponding to the second end.

5. The backlight module of claim 4, wherein the closed loop opening is in the top plate, the periphery of the closed loop opening completely connects the top plate to form the closed loop opening.

6. The backlight module of claim 1, wherein the at least one breach on the top plate forms an open loop opening toward the light guide plate.

7. The backlight module of claim 6, wherein the open loop opening is on the top plate, the periphery of the open loop opening partially connects the top plate to allow an opening direction to face toward the light guide plate.

8. The backlight module of claim 1, wherein the bottom plate and the top plate of the supporter clamp a portion of the light incident side of the light guide plate.

9. The backlight module of claim 1, further comprising an adhesive material disposed between the sidewall and the printed circuit board for positioning the light source module.

10. The backlight module of claim 1, wherein the printed circuit board is a rigid printed circuit board or a flexible printed circuit board.

11. A display device, comprising:
a frame;
a liquid crystal display panel disposed on the frame; and
a backlight module disposed in the frame parallel to the liquid crystal panel, the backlight module, comprising:
a light guide plate having a light incident side;
a supporter having a bottom plate, a sidewall, and a top plate corresponding to the bottom plate, the bottom plate extending from a first end of the sidewall toward the light guide plate, and the top plate extending along a second end of the sidewall toward the light guide plate, wherein the length of the sidewall is longer than the length of the top plate, such that the top plate corresponding to the sidewall forms at least one breach to expose the second end of the sidewall, the bottom plate, the top plate, and the sidewall together form an accommodating space, and the light incident side of the light guide plate is disposed between the top plate and the bottom plate; and
a light source module disposed in the accommodating space and partially exposed through the at least one breach, the light source module having at least one light emitting unit and a printed circuit board, wherein the light emitting unit is disposed on the printed circuit board, such that a emitting surface of the light emitting unit corresponds to the light incident side of the light guide plate.

12. The display device of claim 11, wherein the at least one breach includes a first breach and a second breach respectively disposed on two sides of the top plate to partially expose the second end.

13. The display device of claim 11, wherein the at least one breach and the top plate are alternatively equally spaced on the second end of the sidewall to partially expose the second end.

14. The display device of claim 11, wherein the at least one breach includes a closed loop opening formed between the second end of the sidewall and an edge of the top plate corresponding to the second end.

15. The display device of claim 11, wherein the closed loop opening is in the top plate, the periphery of the closed loop opening completely connects the top plate to form the closed loop opening.

16. The display device of claim 11, wherein the at least one breach on the top plate forms an open loop opening toward the light guide plate.

17. The display device of claim 16, wherein the open loop opening is on the top plate, the periphery of the open loop opening partially connects the top plate to allow an opening direction to face toward the light guide plate.

18. The display device of claim 11, further comprising an adhesive material disposed between the sidewall and the printed circuit board for positioning the light source module.

19. The display device of claim 11, further comprising an adhesive material disposed between the bottom plate and the printed circuit board for positioning the light source module.

20. The display device of claim 19, wherein the adhesive material is disposed corresponding to the at least one breach.

21. The backlight module of claim 11, wherein the printed circuit board is a rigid printed circuit board or a flexible printed circuit board.

* * * * *